United States Patent [19]

Kipp

[11] 4,452,070

[45] Jun. 5, 1984

[54] TESTING CASING CONNECTORS

[75] Inventor: Robert M. Kipp, Houston, Tex.

[73] Assignee: Shell Oil Company, Houston, Tex.

[21] Appl. No.: 333,493

[22] Filed: Dec. 22, 1981

[51] Int. Cl.$^3$ .............................................. G01M 3/02
[52] U.S. Cl. ..................................... 73/49.8; 138/89;
138/90; 73/856
[58] Field of Search ..................... 138/90, 89; 73/49.1,
73/49.5, 49.8, 856; 285/338

[56] References Cited

U.S. PATENT DOCUMENTS

| | | | |
|---|---|---|---|
| 2,246,885 | 6/1941 | Jones ...................................... | 138/90 |
| 2,374,947 | 5/1945 | Nicholson ............................... | 138/90 |
| 2,475,748 | 7/1949 | Leroy ..................................... | 138/90 |
| 2,663,183 | 12/1953 | Huhn ...................................... | 73/46 |
| 2,820,481 | 1/1958 | Hix ........................................ | 138/90 |
| 2,873,764 | 2/1959 | Lombard et al. ................. | 73/49.5 X |
| 3,803,901 | 4/1974 | McConnell et al. ................. | 73/49.8 |
| 4,385,643 | 5/1983 | Noe ................................... | 73/49.1 X |

OTHER PUBLICATIONS

*ISA Journal,* "A Versatile Closure for High Pressure Vessels Utilizing O-Rings for the Initial Seal", Johnson et al., pp. 2–3, 7–1956.

*Primary Examiner*—Gerald Goldberg
*Assistant Examiner*—Brian R. Tumm

[57] ABSTRACT

The present invention pertains to a method and apparatus for testing casing for pressure and tension limits by inserting a sealing plug into both ends of the casing, threads on the plug for gripping the casing, and a compressible packing ring associated with the plug for sealing the casing, and thereafter pressuring and tensioning the plugged casing.

10 Claims, 4 Drawing Figures

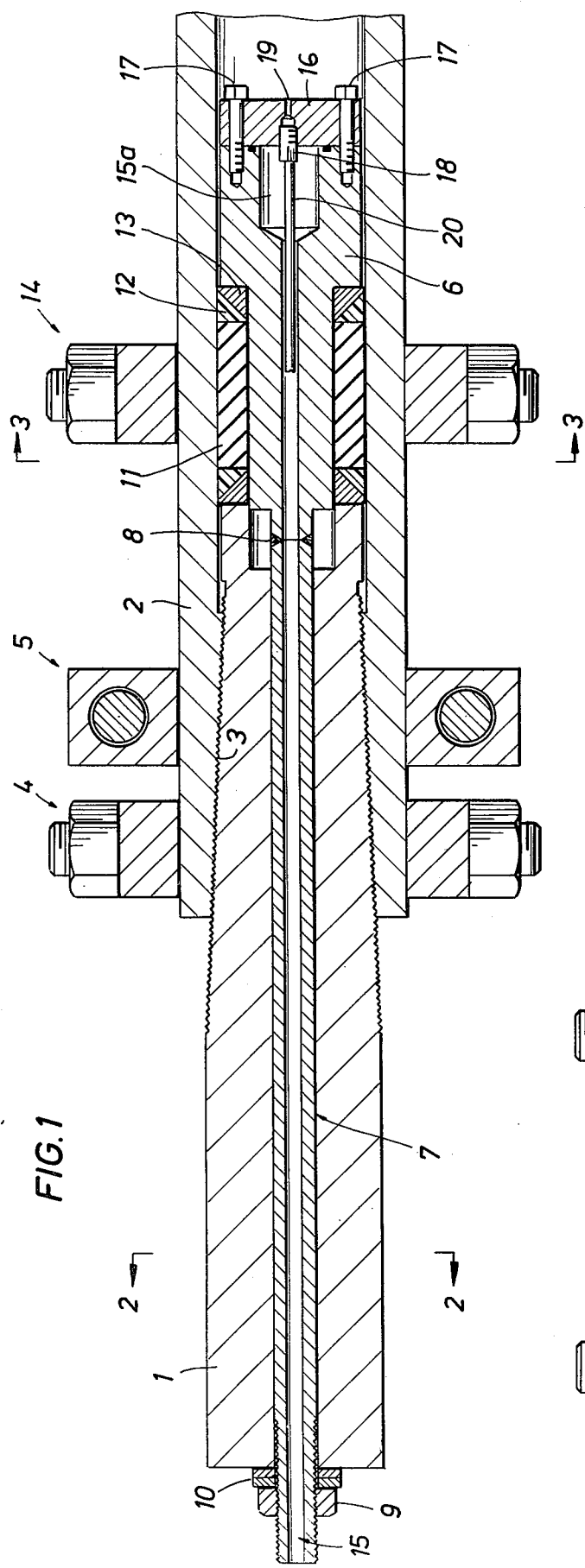
FIG.1
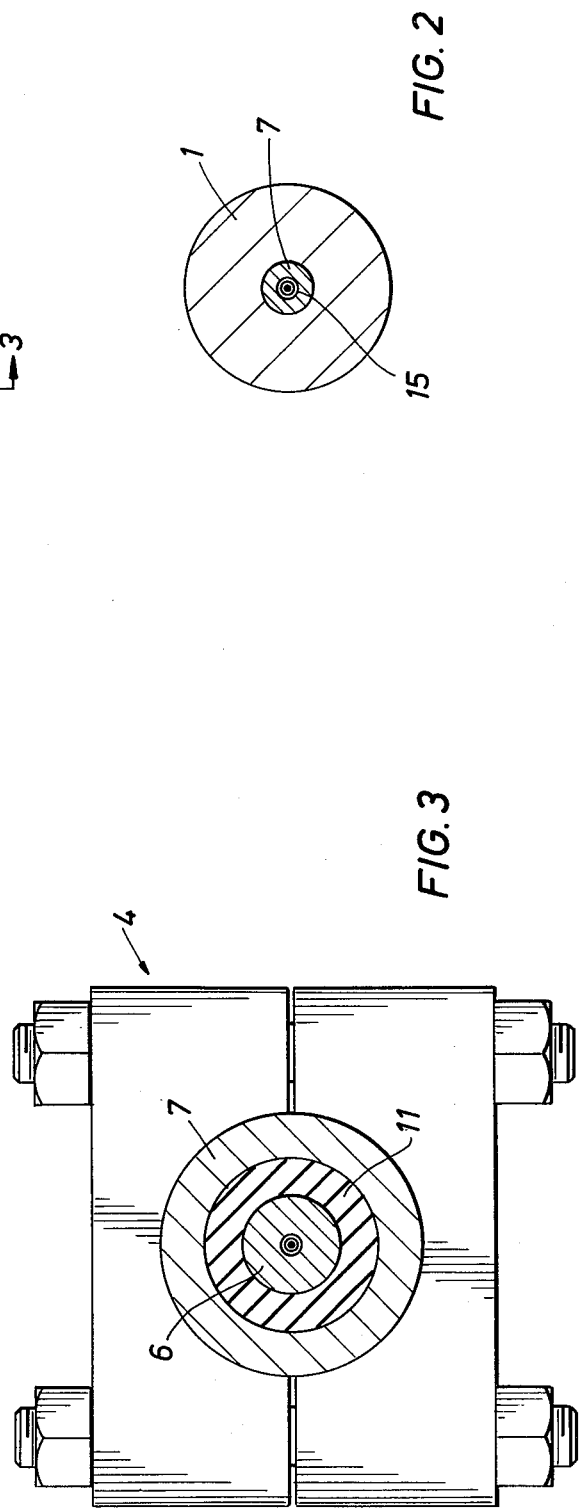
FIG.2
FIG.3

TESTING CASING CONNECTORS

BACKGROUND OF THE INVENTION

Oil well casings usually are made up with threaded connectors. In view of the potential safety hazard and high cost associated with failed casing connectors in wells, it is particularly desirable that the joints formed by such connectors be reliable. However, present methods and apparatus for pressure and tension testing casing connectors frequently are inadequate or unreliable. For example, plugging a length of casing to facilitate testing is difficult and can adversely affect test results. Thus, it is not easy to weld a sealing plug into the casing which is made up of a high strength material, and in addition, the high temperatures of welding such materials lead to weaknesses in the casing, causing misleading results in pressure testing the casing. A sealing plug which is attached by threads also is troublesome, since the casing connector is threaded, and the threaded plug may fail before the connector.

The present invention provides a new method and apparatus for overcoming the above-described difficulties of the prior art.

BRIEF DESCRIPTION OF THE DRAWINGS

FIG. 1 discloses one embodiment of a test plug assembly axially extendable through a plug.

FIGS. 2 and 3 show sectional views of the apparatus of FIG. 1.

SUMMARY OF THE INVENTION

Figure 4:
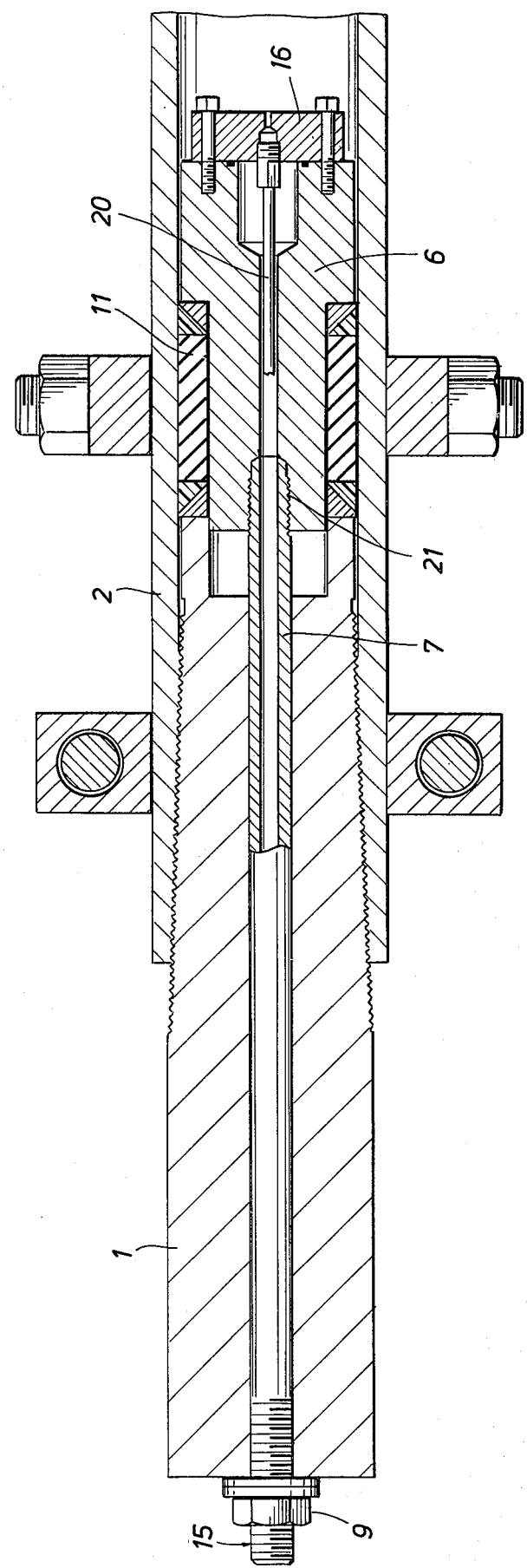
FIG. 4 discloses a second embodiment test plug assembly.

The purpose of the present invention is to provide a method and apparatus for sealing and tensioning a tube, such as oil well casing, and connectors associated with the casing.

Accordingly, the present invention provides apparatus for sealing and tensioning a tubing such as oil well casing, including a plug insertable into one end of the casing, means associated with the plug for gripping the casing, separate means associated with the plug for sealing the casing, and means for transferring tension through the plug to the casing. The means for gripping the casing is a circumferentially threaded portion of the plug engagable with a correspondingly threaded portion inside the casing. The means for sealing the casing is a compressible packing ring which is compressed by a rod axially extendable through the plug and operative to pull together parts of the plug which enclose the packing ring. The rod for pulling the gripping and sealing parts of the plug together may be hollow which facilitates filling the casing with pressurizing fluid.

In accordance with the method of the invention, a plug is inserted into one end of a tubing such as oil well casing, and the casing is gripped with one part of the plug and sealed with a separate part of the plug, and tension is transferred through the plug to the casing. Preferably, another plug is inserted in the opposite end of the casing, which then is inclined while the casing is filled with pressurizing fluid prior to sealing the casing. The casing may have a casing connector disposed intermediate the length of the casing, and another plug is then inserted in the opposite end of the casing.

DESCRIPTION OF PREFERRED EMBODIMENTS

In accordance with the first embodiment of the invention as shown in FIG. 1 of the drawings, plug 1 is insertable into an end of a casing or other tubing 2, having a threaded portion with matching threads 3 on the plug. Outside the threaded part of casing 2, two clamps 4 and 5 are located which prevent casing expansion. Plug 1 is connected to plug 6 by a rod 7 which is axially extendable through the plugs and connected by welding 8 or other connection means. Nut 9, at one end of plug 1, is adjacent washers and operative to pull rod 7 and connected plug 6 toward plug 1, thereby squeezing packing member 11 surrounded by rings 12 and 13. Packing member 11 is a relatively compressible material such as soft rubber, whereas ring 12 is a less compressible material such as a fiber-filled polytetrafluoroethylene washer, and ring 13 which is on the outside of ring 12 is an even less compressible material such as brass. A significant advantage of use of a soft sealing member 11 is that a reliable seal may be obtained on the interior surface of the casing 2 without special preparation and machining of the interior surface other than a superficial cleaning of the surface to remove scale and light debris. The two rings 12 and 13 function to keep the compressible rubber packing seal from being squeezed out through the cracks between plugs 1 and 6 and casing 2. A third clamp 14 is provided around the outside of casing in the area adjacent the packing ring in order to keep the casing from expanding and letting pressurized fluid escape. Open space 15a is provided adjacent cap 16 which is attached to plug 6 by means of bolts 17. An autoclave fitting 18 is attached on the inside of the cap 16 adjacent to the plug and connecting with a hole 19 through the cap which communicates with the interior of the casing. High pressure tubing 20 passes from the autoclave fitting through the borehole 15 and communicates with means (not shown) for putting high pressure fluid into the casing. Means (also not shown) can be attached to the plug 1 in order to facilitate applying tension to the casing 2.

It will be readily apparent that a significant feature of the present invention resides in separating the gripping means 3, a threaded connection in the embodiment of FIG. 1, from the plugging means 11, a rubber packing ring in the embodiment of FIG. 1. The possibility of casing 2 flexing and releasing from the gripping and plugging means is offset by providing clamps 4, 5 and 14 on the outside of the casing.

FIG. 2 of the invention provides a cross-sectional view along the lines 2—2 of FIG. 1 and shows the plug 1, the rod 7 and the hollow portion 15 through the center of the rod. In FIG. 3 there is shown a cross-sectional view along the lines 3—3 of FIG. 1 showing the clamp assembly which includes the clamp 4 and associated means for applying pressure to the clamp.

In FIG. 4 of the drawings another embodiment of the invention is shown. It will be noted that the rod 7 is provided with a threaded end 21 which connects with associated threads of plug 6. Disconnecting packing rubber 11 from casing 2, after sealing and testing has been conducted, can be troublesome. Thus, there is a tendency for the hollow rod to fracture in applying tension following removal of threaded plug 1. Accordingly, it has been found desirable to substitute the hollow rod with a solid rod (not shown) so that plug 6 can be pulled from casing 2, bringing packing member 11 and rings 12 and 13. The tensile capacity of the hollow rod 7 is adequate to ensure sealing by the packing member 11 since the packing member is relatively soft and easily deformable into contact with the interior wall of casing 2. Following initial contact of the casing wall by the packing member, the sealing action gives rise to pressure forces which act to axially drive plug 6 towards plug 1. This action is commonly known as "pressure activated sealing". If means are provided, such as by cutting the casing 2 in the vacant interior region of the casing near the end of the plug assembly, plug 6 may be driven axially from within the packing element 11 by application of compressive force to rod 7. The hollow rod 7 is thought to be adequate for this purpose, but may be substituted with a solid bar as found necessary. Furthermore, end cap 16 may be removed and replaced with a pulling fixture (not shown) for attachment at the holes for bolts 17 in order to provide additional force for pulling plug 6 from within packing element 11. In addition, in the embodiment of FIG. 4 the end cap 16 is solid as opposed to perforated as shown in the end cap of FIG. 1. Thus, it is possible to fill the casing by means other than that described in connection with the embodiment of FIG. 1. It is also feasible to employ cavity 15 for inserting signal sensing means (not shown) into the casing, e.g. a strain gauge may be inserted into the casing via this aperture.

An advantageous method for filling the casing with fluid requires tilting the casing after the plug has been inserted thereinto and prior to sealing the casing with the packing rubber 11. As fluid passes through the cavity 15 into the casing, gas is allowed to escape past the packing ring. Once the casing has been filled with fluid and all the gas is out, the packing rubber 11 can then be seated, facilitating pressuring up of the casing. It is feasible but difficult to fill the casing with fluid and allow gas to pass through the same orifice.

Accordingly, it will be apparent that the present invention enjoys several advantages over the prior art. First, the apparatus is reusable, unlike plugs which are welded to the casing. The disadvantages of welding are several, since not only are extreme difficulties associated with welding high strength material, but also weaknesses may result in the casing from the welding. Even after the threads of the plug of the present invention have become worn from repeated use, it is possible to machine off the entire portion of the threads and cut a newly threaded portion on the remaining plug. Thus, the plug of the present invention is not only reusable and employable with a certain amount of speed, but it is also reliable since it separates the gripping function of the plug from the sealing function. In addition, it can be used with advantage as above mentioned in removing gas from the casing prior to sealing the casing with the packing rubber. Further, the separation of the plugging means and sealing means and the application of a highly deformable sealing mechanism backed up by less deformable rings permits the plug to be used in casings which have a moderate deviation is size of inside diameter, without adversely affecting results. Hence, the plug need not be customized for each casing with which it is employed.

Other combinations and modifications of the present invention will be readily apparent to those skilled in the art without departing from the spirit and scope of the invention as above disclosed.

What is claimed is:

1. Apparatus for sealing and tensioning a tube, comprising, a first plug insertable into one end of the tube, a circumferentially threaded portion of the first plug engageable with a correspondingly threaded portion inside the tube and functional to grip the end of the tube, a compressible packing ring for sealing the end of the tube, a rod axially entendable through the first plug and connected to a second plug which extends at least partly past the packing ring, the rod being tensionable to axially pull the second plug toward the first plug and compress the packing ring between the two plugs into a sealing mode, and a borehole in the rod for injecting pressurized fluid through the rod and into the tube.

2. The apparatus of claim 1 wherein a clamp encloses the outside of the threaded portion of the tube.

3. The apparatus of claim 1 wherein a clamp encloses the outside of the tube adjacent the packing ring.

4. The apparatus of claim 1 wherein a soft sealing ring, which is less compressible than the packing ring, encloses the lateral edges of the packing ring.

5. The apparatus of claim 4 wherein a firm ring, less compressible than the soft sealing ring, encloses the lateral edges of the soft sealing ring.

6. The apparatus of claim 5 wherein the soft sealing ring is fiber-filled polytetrafluoroethylene and the firm sealing ring is brass.

7. The apparatus of claim 6 wherein the interface of the soft and firm rings is at an angle intersecting the inside edge of the packing ring.

8. Apparatus for sealing and tensioning a tube, comprising, a first plug insertable into one end of the tube, a circumferentially threaded portion of the first plug engageable with a correspondingly threaded portion inside the tube and functional to grip the end of the tube, a compressible packing ring for sealing the tube, a rod axially entendable through the first plug and connected to a second plug which entends at least partly past the packing ring, the rod being tensionable to axially pull the second plug toward the first plug and compress the packing ring between the two plugs into a sealing mode, a borehole in the rod for injecting pressurized fluid through the rod and into the tube, and a solid rod substitutable for the borehole containing rod to facilitate removal of the second plug from the tube after completion of sealing and tensioning the tube.

9. The apparatus of claim 8 including high pressure tubing fitting through the borehole and operable to conduct the pressurized fluid into the tube.

10. The apparatus of claim 9 wherein the high pressure tubing communicates with an autoclave fitting which is attached to a cap covering the end of the second plug.

* * * * *